United States Patent
Weber et al.

(10) Patent No.: US 7,045,638 B2
(45) Date of Patent: *May 16, 2006

(54) PIGMENT DISPERSANTS BASED ON DIKETOPYRROLOPYRROLE COMPOUNDS AND PIGMENT PREPARATIONS

(75) Inventors: Joachim Weber, Frankfurt am Main (DE); Felix Wendelin Grimm, Hofheim (DE); Erwin Dietz, Königstein (DE)

(73) Assignee: Clariant GmbH, Frankfurt (DE)

( * ) Notice: Subject to any disclaimer, the term of this patent is extended or adjusted under 35 U.S.C. 154(b) by 116 days.

This patent is subject to a terminal disclaimer.

(21) Appl. No.: 10/375,668

(22) Filed: Feb. 27, 2003

(65) Prior Publication Data

US 2003/0162977 A1 Aug. 28, 2003

Related U.S. Application Data

(63) Continuation of application No. 09/727,960, filed on Dec. 1, 2000.

(30) Foreign Application Priority Data

Dec. 2, 1999 (DE) .......................................... 199 58 181

(51) Int. Cl.
*C07D 487/02* (2006.01)

(52) U.S. Cl. ........................ 548/453; 106/493; 106/494
(58) Field of Classification Search ................ 548/453; 106/493, 494
See application file for complete search history.

(56) References Cited

U.S. PATENT DOCUMENTS

| | | | |
|---|---|---|---|
| 4,310,359 A | 1/1982 | Ehashi et al. ................ 106/288 |
| 4,914,211 A | 4/1990 | Jost et al. .................... 548/435 |
| 4,931,566 A * | 6/1990 | Surber et al. ................ 548/453 |
| 4,986,852 A | 1/1991 | Dietz et al. .................. 106/498 |
| 5,071,483 A | 12/1991 | Dietz et al. .................. 106/498 |
| 5,261,032 A | 11/1993 | Rocchetti et al. ........... 395/141 |
| 5,264,032 A | 11/1993 | Dietz et al. .................. 106/411 |
| 5,380,870 A | 1/1995 | Hari et al. ................... 548/453 |
| 5,472,494 A | 12/1995 | Hertzenegger et al. ..... 106/493 |
| 5,821,373 A | 10/1998 | Hao et al. .................... 548/453 |
| 5,837,160 A | 11/1998 | Dietz et al. ............. 252/299.01 |
| 6,066,202 A | 5/2000 | Wallquist et al. ........... 106/494 |
| 6,409,816 B1 | 6/2002 | Weber et al. ................ 106/494 |

FOREIGN PATENT DOCUMENTS

| | | |
|---|---|---|
| DE | 31 06 906 | 1/1982 |
| DE | 40 11 927 | 10/1990 |
| EP | 0 224 445 | 6/1987 |
| EP | 0 321 919 | 6/1989 |
| EP | 0 636 666 | 2/1995 |
| EP | 0 763 572 | 3/1997 |
| EP | 0 877 058 | 11/1998 |
| EP | 0 962 499 | 12/1999 |
| JP | H3-26767 | 2/1991 |

OTHER PUBLICATIONS

English abstract for DE 4011927, Oct. 18, 1990.
Machine Assisted English Translation of Unexamined Japanese Patent 2000273346, published Oct. 3, 2000.

* cited by examiner

*Primary Examiner*—Joseph K. McKane
*Assistant Examiner*—Kamal Saeed
(74) *Attorney, Agent, or Firm*—Anthony A. Bisulca

(57) ABSTRACT

The invention provides novel pigment dispersants of the formula (I)

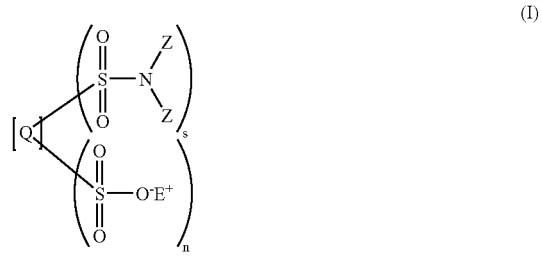

in which is a radical of the formula (Ia)

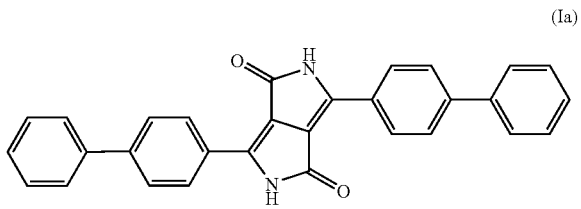

s is a number from 0.1 to 4.0 and
n is a number from 0 to 2.0;
and provides pigment preparations comprising an organic base pigment and a pigment dispersant of the formula (I).

5 Claims, No Drawings

PIGMENT DISPERSANTS BASED ON DIKETOPYRROLOPYRROLE COMPOUNDS AND PIGMENT PREPARATIONS

CROSS REFERENCE TO RELATED APPLICATION

This application is a continuation application of co-pending U.S. application Ser. No. 09/727,960, filed Dec. 1, 2000.

BACKGROUND OF THE INVENTION

(1) FIELD OF THE INVENTION

The present invention relates to novel pigment dispersants and pigment preparations having improved coloristic and rheological properties and to their preparation and use for pigmenting high molecular mass materials.

Pigment preparations are combinations of pigments and pigment dispersants that are structurally analogous to pigments and are substituted by groups having a specific activity. The dispersants are added to the pigments in order to facilitate their dispersion in the application media, especially in varnishes, and to improve the rheological and coloristic properties of the pigments. The viscosity of the highly pigmented paint concentrate (milibase) is lowered and the flocculation of the pigment particles reduced. This makes it possible, for example, to enhance the transparency and gloss. Such enhancement is particularly desirable in the case of metallic pigments.

There are a large number of proposals for improving the rheological and coloristic properties of organic pigments by adding pigment dispersants, but they do not always lead to the result hoped for.

For instance, EP-A-0 321 919 describes the production of pigment preparations by mixing the base pigments with pigment derivatives containing methyleneimidazolyl groups. EP-A-0 877 058 describes the preparation of carboxamido-containing pigment dispersants, and pigment preparations comprising these pigment dispersants.

DE-A-3 106 906 describes the preparation of sulfonamido-containing pigment dispersants. Pigment dispersants based on diketopyrrolopyrrole compounds, however, are not mentioned.

JP H3-26767 describes sulfonamido-containing pigment dispersants based on diketopyrrolopyrrole compounds. The pigment preparations produced with them, however, do not meet every requirement imposed on pigment preparations in respect of the performance properties. For instance, their solvent fastness and fastness to overcoating is inadequate, so greatly restricting their universal application.

SUMMARY OF THE INVENTION

There was a need for improvement, and, accordingly, the object was to provide pigment preparations which overcome the abovementioned disadvantages of the prior art.

It has been found that the object is achieved, surprisingly, by means of pigment dispersants based on specific diketopyrrolopyrrole compounds.

DESCRIPTION OF THE PREFERRED EMBODIMENTS

The invention provides pigment dispersants of the formula (I)

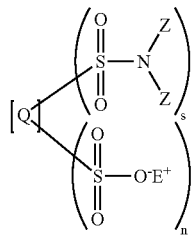

in which Q is a radical of the diketopyrrolopyrrole compound of the formula (Ia)

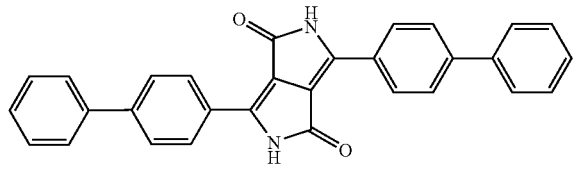

s is a number from 0.1 to 4.0, n is a number from 0 to 2, $E^+$ is $H^+$ or the equivalent $M^{m+}/m$ of a metal cation $M^{m+}$ from main groups 1 to 5 or transition groups 1 or 2 or 4 to 8 of the periodic system of the chemical elements, m being 1, 2 or 3, such as, for example, $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$; an ammonium ion $N^+R^9R^{10}R^{11}R^{12}$, where the substituents $R^9$, $R^{10}$, $R^{11}$ and $R^{12}$ independently of one another are each a hydrogen atom, $C_1$—$C_{30}$-alkyl, $C_2$—$C_{30}$-alkenyl, $C_5$—$C_{30}$-cycloalkyl, phenyl, $(C_1$—$C_8)$-alkylphenyl, $(C_1$—$C_4)$-alkylene-phenyl, such as benzyl, or a (poly)alkyleneoxy group of the formula —[CH($R^{80}$)—CH($R^{80}$)—O]$_k$—H, in which k is a number from 1 to 30 and the two radicals $R^{80}$ independently of one another are hydrogen, $C_1$—$C_4$-alkyl or, if k is >1, a combination thereof, and in which alkyl, alkenyl, cycloalkyl, phenyl or alkylphenyl $R^9$, $R^{10}$, $R^{11}$, and/or $R^{12}$ may be substituted by amino, hydroxyl and/or carboxyl;

or where the substituents $R^9$ and $R^{10}$, together with the quaternary nitrogen atom, are able to form a five- to seven-membered saturated ring system containing, if desired, further heteroatoms from the group consisting of O, S and N, said system being, for example, of the pyrrolidone, imidazolidine, hexamethyleneimine, piperidine, piperazine or morpholine type;

or where the substituents $R^9$, $R^{10}$ and $R^{11}$, together with the quaternary nitrogen atom, are able to form a five- to seven-membered aromatic ring system, containing, if desired, further heteroatoms from the group consisting of O, S and N, and to which additional rings may be fused if desired, said ring system being, for example, of the pyrrole, imidazole, pyridine, picoline, pyrazine, quinoline or isoquinoline type;

or in which $E^+$ defines an ammonium ion of the formula (Ic)

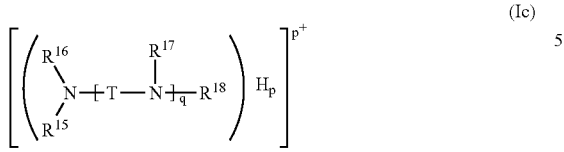

in which
R$^{15}$, R$^{16}$, R$^{17}$ and R$^{18}$ independently of one another are hydrogen or a (poly)alkyleneoxy group of the formula —[CH(R$^{80}$)—CH(R$^{80}$)O]$_k$—H, in which k is a number from 1 to 30 and the two radicals R$^{80}$ independently of one another are hydrogen, $C_1$—$C_4$-alkyl or, if k is >1, a combination thereof;
q is a number from 1 to 10, preferably 1, 2, 3, 4 or 5;
p is a number from 1 to 5, where p is $\leq$q+1;
T is a branched or unbranched $C_2$—$C_6$-alkylene radical; or in which T, if q is >1, may also be a combination of branched or unbranched $C_2$—$C_8$-alkylene radicals;
and in which the two radicals Z are identical or different and Z has the definition $Z^1$ or $Z^4$, where
$Z^1$ is a radical of the formula (Ib)

—[X—Y]$_q$R$^3$     (Ib)

in which
X is a $C_2$—$C_6$-alkylene radical, a $C_5$—$C_7$-cycloalkylene radical, or a combination of these radicals, it being possible for these radicals to be substituted by from 1 to 4 $C_1$—$C_4$-alkyl radicals, hydroxyl radicals, ($C_1$—$C_4$)-hydroxyalkyl radicals and/or by 1 or 2 further $C_5$—$C_7$-cycloalkyl radicals, or in which X, if q is >1, may also be a combination of said definitions;
Y is a —O—,

or —NR$^2$— group,
or in which Y, if q is >1, may also be a combination of said definitions;
q is a number from 1 to 10, preferably 1, 2, 3, 4 or 5;
R$^2$ and R$^3$ independently of one another are a hydrogen atom, a substituted or unsubstituted, or partly fluorinated or perfluorinated, branched or unbranched ($C_1$—$C_{20}$)-alkyl group, a substituted or unsubstituted $C_5$—$C_7$-cycloalkyl group or a substituted or unsubstituted, or partly fluorinated or perfluorinated ($C_2$—$C_{20}$)-alkenyl group, it being possible for the substituents to be hydroxyl, phenyl, cyano, chloro, bromo, amino, $C_2$—$C_4$-acyl or $C_1$—$C_4$-alkoxy and to be preferably 1 to 4 in number, or
R$^2$ and R$^3$, together with the nitrogen atom, form a saturated, unsaturated or aromatic heterocyclic 5- to 7-membered ring containing, if desired, 1 or 2 further nitrogen, oxygen or sulfur atoms or carbonyl groups in the ring, being substituted if desired by 1, 2 or 3 of the radicals OH, phenyl, CN, Cl, Br, $C_1$—$C_4$-alkyl, $C_1$—$C_4$-alkoxy, $C_2$—$C_4$-acyl and carbamoyl, and carrying, if desired, 1 or 2 benzo-fused saturated, unsaturated or aromatic, carbocyclic or heterocyclic rings;

and where
$Z^4$ is hydrogen, hydroxyl, amino, phenyl, ($C_1$—$C_4$)-alkylene-phenyl, $C_5$—$C_7$-cycloalkyl or $C_1$—$C_{20}$-alkyl, it being possible for the phenyl ring, the ($C_1$—$C_4$)-alkylene-phenyl group and the alkyl group to be substituted by one or more, e.g., 1, 2, 3 or 4, substituents from the group consisting of Cl, Br, CN, NH$_2$, OH, $C_6H_5$, mono-, di- or tri-$C_1$—$C_4$-alkoxy-substituted $C_6H_5$, carbamoyl, $C_2$—$C_4$-acyl and $C_1$—$C_4$-alkoxy, e.g., methoxy or ethoxy, and it being possible for the phenyl ring and the ($C_1$—$C_4$)-alkylene-phenyl group to be substituted by NR$^2$R$^3$, R$^2$ and R$^3$ being as defined above, or the alkyl group is perfluorinated or partly fluorinated.

Of interest are pigment dispersants of the formula (I) where s=0.2–3.0 and n=0–05. Of particular interest are pigment dispersants of the formula (I) where s=0.5–2.5 and n=0–0.2.

Further of interest are pigment dispersants of the formula (I) wherein
R$^2$ and R$^3$ independently of one another are a hydrogen atom, a $C_1$—$C_6$-alkyl group or a $C_1$—$C_6$-alkyl group substituted by 1 or 2 substituents from the group consisting of hydroxyl, acetyl, methoxy, ethoxy, chloro and bromo, or
R$^2$ and R$^3$, together with the adjacent nitrogen atom, form an imidazolyl, piperidinyl, morpholinyl, pipecolinyl, pyrrolyl, pyrrolidinyl, pyrazolyl, pyrrolidinonyl, indolyl or piperazinyl ring.

Further of interest are pigment dispersants of the formula (I) wherein X is a $C_2$—$C_4$-alkylene radical or cyclohexylene.

Of particular interest are pigment dispersants of the formula (I) wherein $Z^1$ has the definition —[(CH$_2$)$_3$—NH]$_2$—H, —(CH$_2$—CH$_2$—NH)$_2$H, —(CH$_2$)$_3$—NH—(CH$_2$)$_2$—NH—(CH$_2$)$_3$—NH$_2$,

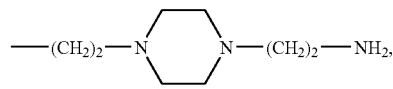

—(CH$_2$)$_3$—N(CH$_3$)—(CH$_2$)$_3$—NH$_2$, —(CH$_2$)$_3$—O—(CH$_2$)$_2$—O—(CH$_2$)$_3$—NH$_2$, —(CH$_2$)$_3$—O—(CH$_2$)$_3$—O—(CH$_2$)$_3$—NH$_2$, —(CH$_2$)$_2$—NH—(CH$_2$)$_3$—NH$_2$, —(CH$_2$)$_3$—NH—(CH$_2$)$_2$—NH$_2$, —(CH$_2$—CH$_2$—NH)$_3$—H, —(CH$_2$—CH$_2$—NH)$_4$—H, —(CH$_2$—CH$_2$—NH)$_5$—H, —(CH$_2$)$_3$—O—(CH$_2$)$_2$—O—(CH$_2$)$_2$—O—(CH$_2$)$_3$—NH$_2$, —(CH$_2$)$_3$—O—(CH$_2$)$_4$—O—(CH$_2$)$_3$—NH$_2$,

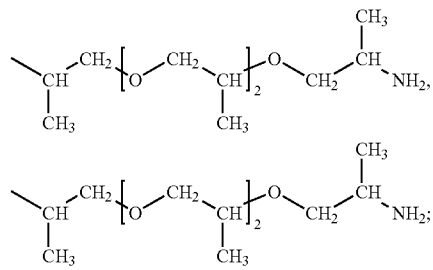

—(CH$_2$)$_2$—OH, —(CH$_2$)$_3$—OH, —CH$_2$—CH(CH$_3$)—OH, —CH(CH$_2$—CH$_3$)CH$_2$—OH, —CH(CH$_2$OH)$_2$, —(CH$_2$)$_2$—O—(CH$_2$)$_2$—OH or —(CH$_2$)$_3$—O—(CH$_2$)$_2$—O—

—(CH$_2$)—OH, —(CH$_2$)$_2$—NH$_2$, —(CH$_2$)$_3$—NH$_2$, —CH$_2$—CH(CH$_3$)—NH$_2$, —CH$_2$—C(CH$_3$)$_2$—CH$_2$—NH$_2$,

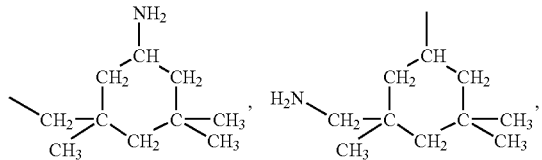

—(CH$_2$)$_2$—NH—CH$_3$, —(CH$_2$)$_2$—N(CH$_3$)$_2$, —(CH$_2$)$_2$—NH—CH$_2$—CH$_3$, —(CH$_2$)$_2$—N(CH$_2$—CH$_3$)$_2$, —(CH$_2$)$_3$—NH—CH$_3$, —(CH$_2$)$_3$—N(CH$_3$)$_2$, —(CH$_2$)$_3$—NH—CH$_2$—CH$_3$ or —(CH$_2$)$_3$—N(CH$_2$—CH$_3$)$_2$.

Further of interest are pigment dispersants of the formula (I) wherein $Z^4$ is hydrogen, amino, phenyl, benzyl, $NR^2R^3$-substituted phenyl or benzyl, $C_1$—$C_6$-alkyl, or a $C_2$—$C_6$-alkyl, phenyl or benzyl which is substituted by 1 or 2 substituents from the group consisting of hydroxyl, acetyl, methoxy and ethoxy, and with particular preference is hydrogen,

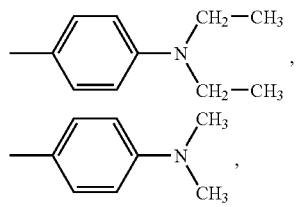

methyl, ethyl, propyl, butyl, benzyl, hydroxyethyl, hydroxypropyl or methoxypropyl.

The pigment dispersants of the invention may be prepared by chlorosulfonating the diketopyrrolopyrrole compound of the formula (Ia)

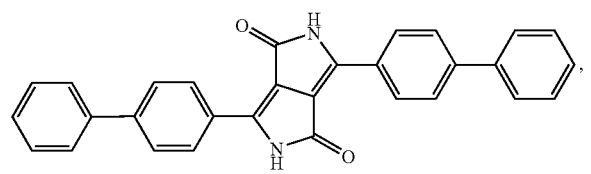
(Ia)

and then reacting the sulfochloride with an amine of the formula (V)

(V)

in which Z is as defined above.

Examples of amines of the formula (V) which may be used are ammonia, methylamine, ethylamine, n-propylamine, isopropylamine, n-butylamine, sec-butylamine, isopentylamine, n-hexylamine, dimethylamine, diethylamine, dibutylamine, n-ethylbutylamine, β-hydroxyethylamine, β- or γ-hydroxypropylamine, n-methylethanolamine, diethanolamine, 3-(2-hydroxyethylamino)-1-propanol, N-(2-hydroxyethyl)aniline, hydroxylamine, hydrazine, N,N-dimethyl-p-phenylenediamine, dimethylaminomethylamine, diethylaminoethylamine, 2-ethylhexylaminoethylamine, stearylaminoethylamine, oleylaminoethylamine, dimethylaminoproyplamine, diethylaminopropylamine, dibutylaminopropylamine, diethylaminobutylamine, dimethylaminoamylamine, diethylaminohexylamine, 1-diethylamino-4-aminopentane, piperidinomethylamine, piperidinoethylamine, piperidinopropylamine, pipecolinoethylamine, pipecolinopropylamine, imidazolopropylamine, morpholinoethylamine, morpholinopropylamine, piperazinoethylamine, 2-methoxyethylamine, 3-ethoxypropylamine, di-(2-methoxyethyl)amine, cyclohexylamine, N-ethylcyclohexylamine, dicyclohexylamine, benzylamine, 2-phenylethylamine, 4-methoxyphenylethylamine, 1-methyl-3-phenylpropylamine, 2-(3,4-dimethoxyphenyl)ethylamine, aniline, o-toluidine, p-toluidine, N-ethylaniline, 3-(cyclohexylamino)propylamine, 2-(2-aminoethoxy)ethanol, 2-(2-(3-aminopropoxy)-ethoxy)ethanol, 3,3'-oxy-bis(ethyleneoxy)bis(propylamine), ethylenediamine, 1,2-propanediamine, 1,3-propanediamine, 2,2-dimethyl-1,3-propanediamine, isophoronediamine, diethylenetriamine, triethylenetetramine, tetraethylenepentamine, pentaethylenehexamine, dipropylenetriamine, N,N-bis(3-aminopropyl)methylamine, tripropylenetetramine, 3-(2-aminoethyl)-aminopropylamine, N,N'-bis-(3-aminopropyl)ethylenediamine, bis(3-dimethylaminopropyl)amine, 4,7-dioxadecane-1,10-diamine, 4,9-dioxadodecane-1,12-diamine, 5-amino-1,3,3-trimethylcyclohexanemethanamine or 1,4-bis(3-aminopropoxy)butane.

The chlorosulfonation is judiciously conducted using chlorosulfonic acid in a weight excess of from 4 to 25 times, based on the diketopyrrolopyrrole, and preferably further adding from 1 to 10 times the molar amount, based on the diketopyrroloyrrole, of thionyl chloride. The chlorosulfonation is preferably conducted at a temperature of from −10 to +150° C., in particular at from 0 to 100° C., under atmospheric or superatmospheric pressure. The diketopyrrolopyrrole sulfochloride is judiciously precipitated in water and isolated.

The reaction of the sulfochloride with the amine takes place preferably at a temperature of from 0 to 100° C., in particular at from 0 to 70° C. The molar amounts of amine:sulfochloride are judiciously (from 0.5 to 10):1, in particular (1–4):1.

The present invention further provides a pigment preparation comprising a) at least one organic base pigment, and b) at least one pigment dispersant of the formula (I).

By base pigments are meant organic pigments or mixtures of organic pigments which may also be present in the form of customary pigment preparations. Examples of suitable base pigments for producing the pigment preparations of the invention are perylene, perinone, quinacridone, quinacridonequinone, anthraquinone, anthanthrone, benzimidazolone, disazo condensation, azo, indanthrone, phthalocyanine, triarylcarbonium, dioxazine, aminoanthraquinone, diketopyrrolopyrrole, thioindigo, isoindoline, isoindolinone, pyranthrone, isoviolanthrone and carbon black pigments or mrxtures thereof.

Examples of preferred base pigments for the purposes of the present invention are C.I. Pigment Red 123 (C.I. No. 71145), C.I. Pigment Red 149 (C.l. No. 71137), C.I. Pigment Red 178 (C.I. No. 71 155), C.I. Pigment Red 179 (C.I. No. 71 130), C.I. Pigment Red 190 (C.I. 71 140), C.I. Pigment Red 224 (C.I. No. 71 127), C.I. Pigment Violet 29 (C.I. No. 71 129), C.I. Pigment Orange 43 (C.I. No. 71 105), C.I. Pigment Red 194 (C.I. No. 71 100), C.I. Pigment Violet 19 (C.I. No. 73 900), C.I. Pigment Red 122 (C.I. No. 73 915), C.I. Pigment Red 192, C.I. Pigment Red 202 (C.I. No. 73 907), C.I. Pigment Red 207, C.I. Pigment Red 209 (C.I. No. 73 905), C.I. Pigment Red 206 (C.I. No. 73 900/73 920), C.I. Pigment Orange 48 (C.I. No. 73 900/73 920), C.I. Pigment Orange 49 (C.I. No. 73 900/73 920), C.I. Pigment Orange 42, C.I. Pigment Yellow 147, C.I. Pigment Red 168 (C.I. No. 59 300), C.I. Pigment Yellow 120 (C.I. No. 11 783), C.I. Pigment Yellow 151 (C.I. No. 13 980), C.I. Pigment Brown 25(C.I. No. 12 510), C.I. Pigment Violet 32 (C.I. No. 12 517), C.I. Pigment Orange 64; C.I. Pigment Brown 23 (C.I. No. 20 060), C.I. Pigment Red 166 (C.I. No. 20 730), C.I. Pigment Red 170 (C.I. No. 12 475), C.I. Pigment Orange 38 (C.I. No. 12 367), C.I. Pigment Red 188 (C.I. No. 12 467), C.I. Pigment Red 187 (C.I. No. 12 486), C.I. Pigment Orange 34 (C.I. No. 21 115), C.I. Pigment Orange 13 (C.I. No. 21 110), C.I. Pigment Red 9 (C.I. No. 12 460), C.I. Pigment Red 2 (C.I. No. 12 310), C.I. Pigment Red 112 (C.I. No. 12 340), C.I. Pigment Red 7 (C.I. No. 12 420), C.I. Pigment Red 210 (C.I. No. 12 477), C.I. Pigment Red 12 (C.I. No. 12 385), C.I. Pigment Blue 60 (C.I. No. 69 800), C.I. Pigment Green 7 (C.I. No. 74 260), C.I. Pigment Green 36 (C.I. No. 74 265); C.I. Pigment Blue 15:1, 15:2, 15:3, 15:4, 15:6 and 15 (C.I. No. 74 160); C.I. Pigment Blue 56 (C.I. No. 42 800), C.I. Pigment Blue 61 (C.I. No. 42 765:1), C.I. Pigment Violet 23 (C.I. No. 51 319), C.I. Pigment Violet 37 (C.I. No. 51 345), C.I. Pigment Red 177 (C.I. No. 65 300), C.I. Pigment Red 254 (C.I. No. 56 110), C.I. Pigment Red 255 (C.I. No. 56 1050), C.I. Pigment Red 264, C.I. Pigment Red 270, C.I. Pigment Red 272 (C.I. No. 56 1150), C.I. Pigment Red 71, C.I. Pigment Orange 73, C.I. Pigment Red 88 (C.I. No. 73 312).

In addition to the base pigment a) and the pigment.dispersant b), the pigment preparations of the invention may further comprise customary additives, such as fillers, standardizers, surfactants, resins, defoamers, antidust agents, extenders, shading colorants, preservatives, drying retarders, and rheology control additives, for example.

Preferred pigment preparations for the purposes of the present invention consist essentially of
  a) from 50 to 99.5% by weight, preferably from 60 to 98.8% by weight, of at least one base pigment a),
  b) from 0.5 to 20% by weight, preferably from 1 to 15% by weight, of at least one, preferably 1 or 2, pigment dispersant(s) b) of the formula (I),
  c) from 0 to 20% by weight, preferably from 0.1 to 15% by weight, of surfactants, and
  d) from 0 to 20% by weight, preferably from 0.1 to 10% by weight, of further customary additives,
the fractions of the respective components being based on the overall weight of the preparation (100 % by weight).

Suitable surface-active agents c) include anionic or anion-active, cationic or cation-active, or nonionic substances or mixtures thereof. Examples of suitable anionic substances are fatty acid taurides, fatty acid N-methyltaurides, fatty acid isethionates, alkylphenylsulfonates, alkylnaphthalenesulfonates, alkylphenol polyglycol ether sulfates, fatty alcohol polyglycol ether sulfates; fatty acids, e.g., palmitic, stearic and oleic acid; fatty acid amide polyglycol ether sulfates; alkylsulfosuccinamates; alkenylsuccinic monoesters, fatty alcohol polyglycol ether sulfosuccinates, alkanesulfonates, fatty acid glutamates, alkylsulfosuccinates, fatty acid sarcosides; soaps, e.g., alkali metal salts of fatty acids, naphthenic acids and resin acids, e.g., abietic acid, alkali-soluble resins, e.g., rosin-modified maleate resins and condensation products based on cyanuric chloride, taurene, N,N-dialkylaminoalkylamine, such as N,N-diethylaminopropylamine, for example, and p-phenylenediamine; preference is given to resin soaps, i.e., alkali metal salts of resin acids.

Examples of suitable cationic substances are quaternary ammonium salts, fatty amine oxalkylates, oxalkylated polyamines, fatty amine polyglycol ethers, fatty amines, diamines and polyamines derived from fatty amines or fatty alcohols, and the oxalkylates of these amines; imidazolines derived from fatty acids, and salts of these cationic substances.

Examples of suitable nonionic substances are amine oxides, fatty alcohol polyglycol ethers, fatty acid polyglycol esters, betaines, such as fatty acid amide N-propyl betaines, phosphoric esters of fatty alcohols or fatty alcohol polyglycol ethers, fatty acid amide ethoxylates, fatty alcohol-alkylene oxide adducts, and alkylphenol polyglycol ethers.

The pigment preparations of the invention generally comprise solid systems of free-flowing pulverulent consistency, or granules.

The dispersing effect which can be achieved in accordance with the invention is assumed to derive from a modification of the surface structure of the base pigments by the pigment dispersant as per b). Thus in a range of cases the efficacy of the pigment dispersant as per b) and the quality of the pigment preparations produced therewith are dependent on the point in time at which the pigment dispersant as per b) is added in the production process of the base pigment. Where more than one pigment dispersant as per b) is used, the dispersants may be added simultaneously or at different points in time or may be mixed prior to their addition.

The efficacy of the pigment dispersant as per b) may also depend on its particle size and particle morphology and on the extent of the available pigment surface. It may be advantageous to add the pigment dispersant as per b) to the base pigment only in the prospective application medium. The optimum concentration of the pigment dispersant as per b) in each case must be determined by means of preliminary rangefinding tests, since the enhancement of the properties of the base pigments is not always in linear proportion to the amount of pigment dispersant.

The pigment preparations of the invention may comprise mixtures of one or more, preferably 1 or 2, base pigments with one or more, preferably 1 or 2, of the pigment dispersants as per b).

The invention also provides a process for producing a pigment preparation of the invention, which comprises mixing the pigment dispersant(s) as per (b) and the base pigment(s) with one another or causing them to act on one another at any desired point in time during their production process.

The production process of an organic pigment embraces its synthesis, possibly fine division, by grinding or reprecipitation, for example, possibly finishing, and its isolation as a presscake or in the form of dry granules or powder. For example, the pigment dispersant as per b) may be added prior to or during the pigment synthesis, immediately prior to or during the fine division process or a subsequent finishing. The tempetatures prevailing may be, for example, from 0 to 200° C. The pigment dispersant as per b) can of course also be added in portions at different times.

The addition of the pigment dispersant as per b) as part of a fine division process takes place, for example, prior to or during the dry grinding of a crude pigment with or without additional milling auxiliaries on a roll mill or vibratory mill, or prior to or during the wet grinding of a crude pigment in an aqueous, aqueous-organic or organic grinding medium on, for example, a bead mill.

It has also proven suitable to add the pigment dispersant as per b) prior to or after finishing the base pigment in an aqueous, aqueous-alkaline, aqueous-organic or organic medium. The pigment dispersant as per b) may also be added to the water-moist pigment presscake, and incorporated, before drying, in which case the pigment dispersant as per b) may itself be present as a presscake. A further possibility is to make dry mixes of powders or granules of the pigment dispersant as per b) with the powder or granules of one or more base pigments, or to effect mixing by grinding or pulverizing components a) and b).

The pigment preparations of the invention are notable for their outstanding coloristic and rheological properties, especially for outstanding rheology, high flocculation stability, high transparency, ease of dispersibility, excellent gloss behavior, high color strength, excellent fastness to overcoating and to solvents, and very good weather fastness. They are suitable for use both in solventborne and aqueous systems.

The pigment preparations produced in accordance with the invention may be used to pigment high molecular mass organic materials of natural or synthetic origin, examples being plastics, resins, varnishes, paints, or electrophotographic toners and developers, and also writing, drawing and printing inks.

Examples of high molecular mass organic materials which may be pigmented with the abovementioned pigment preparations are cellulose ethers and cellulose esters, such as ethylcellulose, nitrocellulose, cellulose acetate or cellulose butyrate, natural resins or synthetic resins, such as addition-polymerization resins or condensation resins, e.g., amino resins, especially urea-formaldehyde and melamine- formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures.

It is unimportant here whether the abovementioned high molecular mass organic compounds are present in the form of plastic masses, melts, spinning solutions, varnishes, paints or printing inks. Depending on the intended use it is found advantageous to utilize the pigment preparations, obtained in accordance with the invention, as a blend or in the form of prepared formulations or dispersions. Based on the high molecular mass organic material for pigmentation, the pigment preparations of the invention are used in an amount of from 0.05 to 30% by weight, preferably from 0.1 to 15% by weight.

The pigment preparations of the invention are also suitable for use as colorants in electrophotographic toners and developers, such as one- or two-component powder toners (also called one- or two-component developers), magnetic toners, liquid toners, polymerization toners, and specialty toners, for example (L. B. Schein, "Electrophotography and Development Physics"; Springer Series in Electrophysics 14. Springer Verlag, 2nd edition, 1992).

Typical toner binders are addition polymerization, polyaddition and polycondensation resins, such as styrene, styrene-acrylate, styrene-butadiene, acrylate, polyester, and phenol-epoxy resins, polysulfones, polyurethanes, individually or in combination, and also polyethylene and polypropylene, which may include further constituents, such as charge control agents, waxes or flow assistants, or may be modified subsequently with these additives.

Furthermore, the pigment preparations of the invention are suitable for use as colorants in powders and powder coating materials, especially in triboelectrically or electrokinetically sprayable powder coating materials, which are used to coat the surfaces of articles made, for example, of metal, wood, plastic, glass, ceramic, concrete, textile material, paper or rubber (J. F. Hughes, "Electrostatics Powder Coating" Research Studies, John Wiley & Sons, 1984).

Typical powder coating resins used are epoxy resins, carboxyl- and hydroxyl- containing polyester resins, polyurethane resins and acrylic resins, together with customary hardeners. Resin combinations are also used. For example, epoxy resins are frequently used in combination with carboxyl- and hydroxyl-containing polyester resins. Typical hardener components (depending on the resin system) are, for example, acid anhydrides, imidazoles and also dicyandiamide and derivatives thereof, blocked isocyanates, bisacylurethanes, phenolic resins and melamine resins, triglycidyl isocyanurates, oxazolines, and dicarboxylic acids.

In addition, the pigment preparations of the invention are suitable for use as colorants in inkjet inks on either an aqueous or nonaqueous basis and in those inks which operate in accordance with the hot-melt process.

Furthermore, the pigment preparations of the invention are also suitable as colorants for color filters and for both additive and subtractive color generation.

It is also possible for the pigment dispersant as per b) to be added to the base pigment, or vice versa, only in the application medium. The invention therefore further provides a prepared pigment formulation consisting essentially of one or more organic base pigments a), one or more pigment dispersants as per b), said high molecular mass organic material, especially varnish, and, if desired, surfactant and/or other customary additives. The overall amount of base pigment plus pigment dispersant as per b) is, for example, from 0.05 to 30% by weight, preferably from 0.1 to 15% by weight, based on the overall weight of the prepared pigment formulation.

In order to evaluate the properties in the coatings sector of the pigment preparations, a selection was made, from among the large number of known varnishes, of an alkyd-melamine resin varnish (AM) containing aromatic components and based on a medium-oil alkyd resin and on a butanol-etherified melamine resin, of a polyester varnish (PE) based on cellulose acetobutyrate and on a melamine resin, of a high-solids acrylic resin baking varnish based on a nonaqueous dispersion (HS), and of a polyurethane-based aqueous varnish (PUR).

The color strength and shade were determined in accordance with DIN 55986. The rheology of the millbase after dispersion (millbase rheology) was evaluated visually on the basis of the following five-point scale:

5 highly fluid
4 liquid
3 viscous
2 slightly set
1 set

Following dilution of the milibase to the final pigment concentration, the viscosity was assessed using the Rossmann viscospatula type 301 from Erichsen.

Gloss measurements were carried out on cast films at an angle of 20° in accordance with DIN 67530 (ASTMD 523) using the "multigloss" gloss meter from Byk-Mallinckrodt. The solvent fastness was determined in accordance with DIN 55976. The fastness to overcoating was determined in accordance with DIN 53221.

EXAMPLES

In the examples below, parts and percentages are in each case by weight. "min" are minutes.

The formulae given in the following Examples 1 to 10 and 24 to 26 are based on formula (1). In each case, the number n is about (2-s), as Example 1a gives a disulfochloride, and E+ means H+.

Example 1a

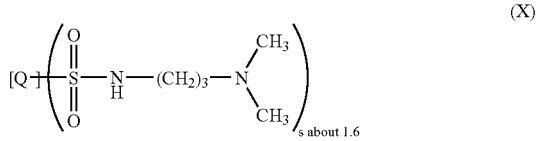
(X)

A four-necked flask is charged with 250 parts of chiorosulfonic acid, and 25 parts 1,4-diketo-3,6-di(4-biphenyl) pyrrolo[3,4-c]pyrrole are introduced and dissolved at a rate such that the temperature does not exceed 25° C. Then 19.64 parts of thionyl chloride are added dropwise over the course of 15 min and the mixture is stirred for 15 min. Over the course of 15 min, the solution is added dropwise to 1000 parts of ice-water, prepared from 333 parts of ice and 667 parts of water. The precipitated disulfochloride is filtered and washed with 750 parts of cold water. A four-necked flask is charged with 70 parts of ice, 70 parts of water and 15.3 parts of 3-dimethylamino-1-propylamine and the disulfochloride presscake is introduced at from 0 to 5° C. The mixture is then stirred at 0 to 5° C. for 1 h, heated to 25° C. in 30 min, stirred at 25° C. for 30 min, heated to 50° C. in 30 min, stirred at 50° C. for 30 min, heated to 70° C. in 30 min and stirred at 70° C. for 30 min. The product is filtered, washed with water and dried in a forced air oven at 80° C. This gives 39.9 parts of pigment dispersant. From the intensities of the $^1$H-NMR signals, the degree of substitution s is calculated to be about 1.6.

$^1$H-NMR (D$_2$SO$_4$): δ7.8; 7.6; 5.9; 3.1; 2.7; 2.5; 1.8 ppm.

Example 1b 30 parts of a standard commercial pigment (C.I. Pigment Red 264) are mixed mechanically with 3 parts of pigment dispersant of the formula X prepared in accordance with Example 1a.

A pigment preparation is obtained which gives transparent and strongly colored coatings in the HS varnish. The gloss measurement gives a value of 65. The metallic coating is strongly colored and bright.

Example 2a

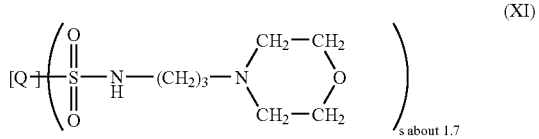
(XI)

The procedure of Example 1a is repeated except that the amine used comprises 21.63 parts of N-(3-aminopropyl)morpholine This gives 42.1 parts of pigment dispersant.

$^1$H-NMR (D$_2$SO$_4$): δ7.8; 7.6; 3.9; 3.6; 3.1; 2.8; 1.8 ppm.

From the intensities of the signals, the degree of substitution s is calculated to be about 1.7.

Example 2b 30 parts of a standard commercial pigment (C.I. Pigment Red 264) are mixed mechanically with 3 parts of pigment dispersant of the formula Xl prepared in accordance with Example 2a.

A pigment preparation is obtained which gives transparent and strongly colored coatings in the HS varnish. The viscosity is 2.6 s. The gloss measurement gives a value of 75. The metallic coating is strongly colored and bright.

Example 3a

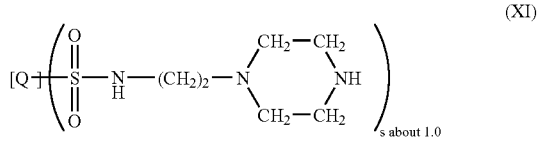
(XI)

The procedure of Example 1a is repeated except that the amine used comprises 19.38 parts of N-(2-aminoethyl)piperazine. This gives 39.3 parts of pigment dispersant.

$^1$H-NMR (D$_2$SO$_4$): δ7.8; 7.6; 3.6; 3.1 ppm.

From the intensities of the signals, the degree of substitution s is calculated to be about 1.0.

Example 3b 30 parts of a standard commercial pigment (C.I. Pigment Red 264) are mixed mechanically with 3 parts of pigment dispersant of the formula XII prepared in accordance with Example 3a. A pigment preparation is obtained which gives transparent and strongly colored coatings in the HS varnish.

Example 4a

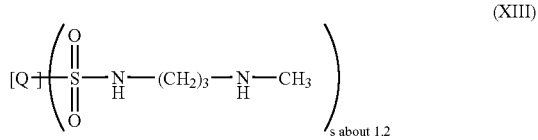
(XIII)

The procedure of Example 1a is repeated except that the amine used comprises 13.22 parts of 3-(methylamino)propylamine. This gives 36.1 parts of pigment dispersant.

$^1$H-NMR (D$_2$SO$_4$): δ7.8; 7.6; 3.2; 2.8; 2.6; 2.4; 1.9; 1.8 ppm.

From the intensities of the signals, the degree of substitution s is calculated to be about 1.2.

Example 4b 30 parts of a standard commercial pigment (C.I. Pigment Red 264) are mixed mechanically with 3 parts of pigment dispersant of the formula XIII prepared in accordance with Example 4a. A pigment preparation is obtained which gives transparent and strongly colored coatings in the HS varnish.

Example 5a $$[Q]\left(\begin{array}{c}O\\\|\\-S-\underset{H}{N}-(CH_2)_2-\underset{H}{N}-(CH_2)_2-OH\\\|\\O\end{array}\right)_{s\ about\ 1.2}$$ (XIII)

The procedure of Example 1a is repeated except that the amine used comprises 15.62 parts of N-(2-aminoethyl)ethanolamine. This gives 37.5 parts of pigment dispersant.

$^1$H-NMR (D$_2$SO$_4$): δ7.8; 7.6; 4.2; 4.1; 3.2; 3.1 ppm.

From the intensities of the signals, the degree of substitution s is calculated to be about 1.2.

Example 5b 30 parts of a standard commercial pigment (C.I. Pigment Red 264) are mixed mechanically with 3 parts of pigment dispersant of the formula XIV prepared in accordance with Example 5a. A pigment preparation is obtained which gives transparent and strongly colored coatings in the HS varnish.

Example 6a $$[Q]\left(\begin{array}{c}O\\\|\\-S-\underset{H}{N}-(CH_2)_3-N\begin{array}{c}(CH_2)_3-CH_3\\\\(CH_2)_3-CH_3\end{array}\\\|\\O\end{array}\right)_{s\ about\ 1.0}$$ (XI)

The procedure of Example 1a is repeated except that the amine used comprises 28.5 parts of 3-(dibutylamino)-1-propylamine, 98% pure. This gives 47.4 parts of pigment dispersant. $^1$H-NMR (D$_2$SO$_4$): δ7.8; 7.6; 3.1; 2.7; 2.6; 1.7; 1.2; 0.9; 0.5 ppm.

From the intensities of the signals, the degree of substitution s is calculated to be about 1.9.

Example 6b 30 parts of a standard commercial pigment (C.I. Pigment Red 264) are mixed mechanically with 3 parts of pigment dispersant of the formula XV prepared in accordance with Example 6a.

A pigment preparation is obtained which gives transparent and strongly colored coatings in the HS varnish. The rheology is evaluated as from 4 to 5 and the viscosity is 1.1 s. The gloss measurement gives a value of 81. The metallic coating is strongly colored and bright.

Without the addition of the pigment dispersant, the HS coatings are weaker in color and substantially more hiding. The rheology is evaluated as 3 and the viscosity is 16.5 a. The gloss measurement gives a value of 52. The metallic coating is markedly weaker in color and less bright.

The coating in the PE varnish is transparent and strongly colored. The gloss measurement gives a value of 82. The metallic coating is strongly colored and bright. Without the addition of the pigment dispersant, the PE coatings are weaker in color, markedly more hiding, and so matt that it is impossible to measure a gloss. The metallic coating is significantly weaker in color and less bright.

Example 7a $$[Q]\left(\begin{array}{c}O\\\|\\-S-\underset{H}{N}-(CH_2)_2-O-(CH_2)_2-OH\\\|\\O\end{array}\right)_{s\ about\ 1.6}$$ (XIII)

The procedure of Example 1a is repeated except that the amine used comprises 15.77 parts of 2-(2-aminoethoxy)ethanol. This gives 40.5 parts of pigment dispersant.

$^1$H-NMR (D$_2$SO$_4$): δ7.8; 7.6; 4.1; 3.5; 3.3; 2.9 ppm.

From the intensities of the signals, the degree of substitution s is calculated to be about 1.6.

Example 7b 30 parts of a standard commercial pigment (C.I. Pigment Red 264) are mixed mechanically with 3 parts of pigment dispersant of the formula XVI prepared in accordance with Example 7a. A pigment preparation is obtained which gives transparent and strongly colored coatings in the HS varnish.

Example 8a $$[Q]\left(\begin{array}{c}O\\\|\\-S-\underset{H}{N}-CH\begin{array}{c}CH_2-CH_3\\\\CH_2-OH\end{array}\\\|\\O\end{array}\right)_{s\ about\ 1.4}$$ (XVII)

The procedure of Example 1a is repeated except that the amine used comprises 13.78 parts of 2-amino-1-butanol. This gives 36.6 parts of pigment dispersant.

$^1$H-NMR (D$_2$SO$_4$): δ7.8; 7.6; 4.3; 4.1; 3.7; 1.5; 0.6 ppm.

From the intensities of the signals, the degree of substitution s is calculated to be about 1.4.

Example 8b 30 parts of a standard commercial pigment (C.I. Pigment Red 264) are mixed mechanically with 3 parts of pigment dispersant of the formula XVII prepared in accordance with Example 8a. A pigment preparation is obtained which gives transparent and strongly colored coatings in the HS varnish.

Example 9a $$[Q]\left(\begin{array}{c}O\\\|\\-S-\underset{H}{N}-(CH_2)_3-N\begin{array}{c}C=O\\\diagup\quad\diagdown\\CH_2\\|\\CH_2-CH_2\end{array}\\\|\\O\end{array}\right)_{s\ about\ 1.6}$$ (XVIII)

The procedure of Example 1a is repeated except that the amine used comprises 21.33 parts of 1-(3-aminopropyl)-2-pyrrolidinone. This gives 42.2 parts of pigment dispersant.

$^1$H-NMR (D$_2$SO$_4$): δ7.8; 7.6; 3.4; 3.2; 2.9; 2.7; 1.8; 1.7 ppm.

From the intensities of the signals, the degree of substitution s is calculated to be about 1.6.

Example 9b 30 parts of a standard commercial pigment (C.I. Pigment Red 264) are mixed mechanically with 3 parts of pigment dispersant of the formula XVIII prepared in accordance with Example 9a. A pigment preparation is obtained which gives transparent and strongly colored coatings in the HS varnish.

Example 10a

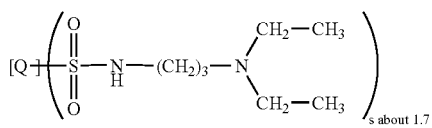

(XIX)

The procedure of Example 1a is repeated except that the amine used comprises 19.54 parts of diethylaminopropylamine. This gives 41.3 parts of pigment dispersant.

$^1$H-NMR (D$_2$SO$_4$): δ7.8; 7.6; 3.1; 2.7; 1.7; 0.8 ppm.

From the intensities of the signals, the degree of substitution s is calculated to be about 1.7.

The solvent fastness of the dispersant is very good.

Example 10b 30 parts of a standard commercial pigment (C.I. Pigment Red 264) are mixed mechanically with 3 parts of pigment dispersant of the formula XIX prepared in accordance with Example 10a.

A pigment preparation is obtained whose solvent fastness is very good and which gives transparent and strongly colored coatings in the HS varnish. The rheology is evaluated as 4-5 and the viscosity is 1.8 s. The gloss measurement gives a value of 71. The metallic coating is strongly colored and bright.

Without the addition of the pigment dispersant, the HS coatings are weaker in color and substantially more hiding. The rheology is evaluated as 3 and the viscosity is so high that it cannot be measured using the viscospatula. The gloss as well is impossible to measure, owing to the severe flocculation. The metallic coating is notably weaker in color and less bright.

The coating in the PE varnish is transparent and strongly colored. The gloss measurement gives a value of 33. The metallic coating is strongly colored and bright. Without the addition of the pigment dispersant, the PE coatings are weaker in color, markedly more hiding, and so matt that it is impossible to measure a gloss. The metallic coating is significantly weaker in color and less bright.

The coating in the AM varnish is transparent and strongly colored. The gloss measurement gives a value of 89. The viscosity is 5.4 s.

Without the addition of the pigment dispersant, the AM coatings are weaker in color, significantly more hiding and so matt that the gloss cannot be measured. The viscosity is so high that it cannot be measured using the viscospatula.

Example 10c 28.5 parts of a standard commercial pigment (C.I. Pigment Red 264) are mixed mechanically with 1.5 parts of pigment dispersant of the formula XIX prepared in accordance with Example 10a. The solvent fastness of the pigment preparation is very good.

Example 11a (Comparative Example A, pigment dispersant of the formula XX from JP-H3-26767, Example 1)

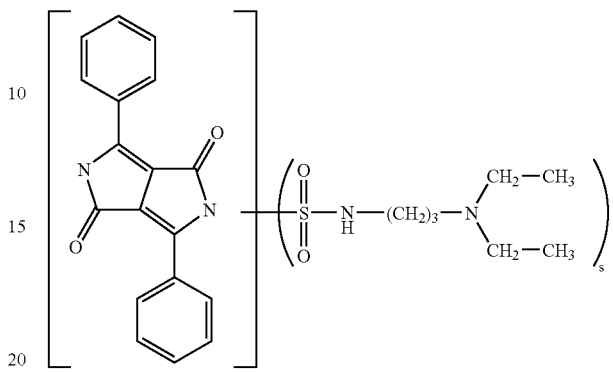

(XX)

The pigment dispersant of the formula XX is prepared as described in JP-H3-26767, Example 1.

$^1$H-NMR (D$_2$SO$_4$): δ8.0; 7.9; 7.8; 7.7; 3.1; 2.7; 1.7; 0.8 ppm.

From the intensities of the signals, the degree of substitution, s, is calculated to be about 1.2.

The solvent fastness of the pigment preparation is inadequate. In comparison to the solvent fastness of the pigment preparation of the formula XIX prepared in accordance with Example 10a it is significantly poorer and thus distinctly inferior.

Example 11b (Comparative Example B: Pigment preparation containing pigment dispersant from JP-H3-26767, Example 1)

28.5 parts of a standard commercial pigment (C.I. Pigment Red 264) are mixed mechanically with 1.5 parts of pigment dispersant of the formula XX prepared in accordance with Example 11a.

The solvent fastness of the pigment preparation is inadequate. In comparison to the solvent fastness of the pigment preparation prepared in accordance with Example 10c it is significantly poorer and thus distinctly inferior.

Example 12a (PE varnish)

A coating is prepared in the PE varnish using the pigment preparation prepared as in Example 10c. The fastness to overcoating is excellent, with no evidence of bleeding. A coating is prepared in the PE varnish using the pigment preparation prepared as in Example 11b. The fastness to overcoating is deficient, with severe bleeding being visible.

Example 12b (PUR varnish)

A coating is prepared in the PUR varnish using the pigment preparation prepared as in Example 10c. The fastness to overcoating is excellent, with no evidence of bleeding.

A coating is prepared in the PUR varnish using the pigment preparation prepared as in Example 11b. The fastness to overcoating is unacceptable, with very severe bleeding being visible.

Example 13a (Comparative Example C: pigment dispersant of the formula (XX) according to Example 10a)

The pigment dispersant of the formula XX is prepared as per Example 10a with the sole difference that, instead of 25 parts of 1,4-diketo-3,6-di-(4-biphenyl)pyrrolo[3,4-c]pyrrole, 16.4 parts of 1,4-diketo-3,6-diphenylpyrrolo[3,4-c]pyrrole are used. This gives 17.2 parts of pigment dispersant.

$^1$H-NMR (D$_2$SO$_4$): δ8.0; 7.9; 7.8; 7.7; 3.1; 2.7; 1.7; 0.8 ppm.

From the intensities of the signals, the degree of substitution s is calculated to be about 0.12.

The solvent fastness of the pigment preparation is inadequate. In comparison to the solvent fastness of the pigment preparation of the formula XIX prepared in accordance with Example 10a it is significantly poorer and thus distinctly inferior.

Example 13b (Comparative Example D; Pigment preparation containing pigment dispersant of the formula (XX) from Example 13a)

30 parts of a standard commercial pigment (C.I. Pigment Red 264) are mixed mechanically with 3 parts of pigment dispersant of the formula (XX) prepared in accordance with Example 13a.

The solvent fastness of the pigment preparation is inadequate. In comparison to the solvent fastness of the pigment preparation prepared in accordance with Example 10c it is significantly poorer and thus distinctly inferior.

Example 14a (PE varnish)

A coating is prepared in the PE varnish using the pigment preparation prepared as in Example 10b. The coating is transparent and strongly colored, the gloss measurement gives a value of 33. The metallic coating is strongly colored and bright. The fastness to overcoating is excellent, with no evidence of bleeding.

A coating is prepared in the PE varnish using the pigment preparation prepared as in Example 13b. Compared with the above coating, it is markedly more hiding, substantially weaker in color, the gloss is impossible to measure owing to the severe flocculation, and the metallic coating is substantially weaker in color and paler. The fastness to overcoating is deficient, with severe bleeding being visible.

Example 14b (PUR varnish)

A coating is prepared in the PUR varnish using the pigment preparation prepared as in Example 10b. The fastness to overcoating is excellent, with no evidence of bleeding.

A coating is prepared in the PUR varnish using the pigment preparation prepared as in Example 13b. The fastness to overcoating is unacceptable, with very severe bleeding being visible.

Example 14c (HS varnish)

A coating is prepared in the HS varnish using the pigment preparation prepared as in Example 10b. This coating is transparent and strongly colored. The rheology is assessed as from 4 to 5 and the viscosity is 1.8 s. The gloss measurement gives a value of 71. The metallic coating is strongly colored and bright. The fastness to overcoating is excellent.

A coating is prepared in the HS varnish using the pigment preparation prepared as in Example 13b. Compared with the above coating, it is notably weaker in color. The rheology is evaluated as only 3 and the viscosity has increased to 3.0 s. The gloss measurement gives a value of only 43. The metallic coating is substantially weaker in color and paler. The test of fastness to overcoating shows marked bleeding.

Example 15

20 parts of a standard commercial pigment (C.I. Pigment Red 177) are mixed mechanically with 1 part of pigment dispersant of the formula XV prepared in accordance with Example 6a.

A pigment preparation is obtained which gives coatings in the HS varnish which, compared with the coatings of the untreated standard commercial pigment (C.I. Pigment Red 177), are more transparent, more glossy and distinctly stronger in color; the masstone coatings of the untreated standard commercial pigment (C.I. Pigment Red 177) show a haze. The metallic coatings of the prepared pigment formulation are significantly cleaner and brighter than the metallic coatings of the untreated standard commercial pigment (C.I. Pigment Red 177).

In the PE varnish, the coatings of the pigment preparation are more transparent, substantially stronger in color and more glossy, and the metallic coatings are substantially stronger in color and brighter than the corresponding coatings of the untreated standard commercial pigment (C.I. Pigment Red 177).

Example 16

20 parts of a standard commercial pigment (C.I. Pigment Brown 25) are mixed mechanically with 1 part of pigment dispersant of the formula XV prepared in accordance with Example 6a.

A pigment preparation is obtained which in the HS varnish gives coatings which, compared with the coatings of the untreated standard commercial pigment (C.I. Pigment Brown 25), are stronger in color. The metallic coatings of the prepared pigment formulation are stronger in color and brighter.

Example 17

20 parts of a standard commercial pigment (C.I. Pigment Violet 23) are mixed mechanically with 1 part of pigment dispersant of the formula XV prepared in accordance with Example 6a.

A pigment preparation is obtained which in the HS varnish gives coatings which, compared with the coatings of the untreated standard commercial pigment (C.I. Pigment Violet 23), are more transparent, stronger in color and substantially redder.

The metallic coatings of the prepared pigment formulation are stronger in color, brighter and substantially redder than the metallic coatings of the untreated standard commercial pigment (C.I. Pigment Violet 23).

In the PE varnish, the coatings of the pigment preparation are more transparent, stronger in color and markedly redder, and the metallic coatings are stronger in color and redder than the corresponding coatings of the untreated standard commercial pigment (C.I. Pigment Violet 23).

Example 18

20 parts of a standard commercial pigment (C.I. Pigment Violet 19, β-phase) are mixed mechanically with 1 part of pigment dispersant of the formula XV prepared in accordance with Example 6a.

A pigment preparation is obtained which in the PE varnish gives coatings which, compared with the coatings of the untreated standard commercial pigment (C.I. Pigment Violet 19, β-phase), are more transparent, stronger in color and cleaner.

The metallic coatings of the prepared pigment formulation are markedly stronger in color and brighter than the metallic coatings of the untreated standard commercial pigment (C.I. Pigment Violet 19, β-phase).

Example 19

20 parts of a standard commercial pigment (C.I. Pigment Blue 15:1) are mixed mechanically with 1 part of pigment dispersant of the formula XV prepared in accordance with Example 6a.

A pigment preparation is obtained which in the HS varnish gives coatings which, compared with the coatings of the untreated standard commercial pigment (C.I. Pigment Blue 15:1), are more transparent, more glossy and stronger in color. The metallic coatings of the prepared pigment formulation are stronger in color and brighter than the metallic coatings of the untreated standard commercial pigment (C.I. Pigment Blue 15:1).

In the PE varnish, the coatings of the pigment preparation are more transparent and the metallic coatings are substantially stronger in color and brighter than the corresponding coatings of the untreated standard commercial pigment (C.I. Pigment Blue 15:1).

Example 20

20 parts of a standard commercial pigment (C.I. Pigment Blue 60) are mixed mechanically with 1 part of pigment dispersant of the formula XV prepared in accordance with Example 6a.

A pigment preparation is obtained which in the HS varnish gives strongly colored and transparent coatings; the metallic coatings are strongly colored and bright.

Example 21

20 parts of a standard commercial pigment (C.I. Pigment Red 179) are mixed mechanically with 1 part of pigment dispersant of the formula XV prepared in accordance with Example 6a.

A pigment preparation is obtained which in the HS varnish gives coatings which, compared with the coatings of the untreated standard commercial pigment (C.I. Pigment Red 179), are more transparent, more strongly colored and more glossy. The metallic coatings of the prepared pigment formulation are more strongly colored and brighter.

Example 22

20 parts of a standard commercial pigment (C.I. Pigment Red 202) are mixed mechanically with 1 part of pigment dispersant of the formula XV prepared in accordance with Example 6a.

A pigment preparation is obtained which in the HS varnish gives transparent and strongly colored coatings; the metallic coatings are strongly colored and bright.

Example 23

298.7 g of tert-amyl alcohol are charged to a vessel and 20.0 g of sodium are added. The mixture is then heated to boiling and stirred until all of the sodium has reacted. After the batch has been cooled to 80° C., 57.8 g of p-chlorobenzonitrile are introduced. The mixture is heated to 98–100° C. and 62.7 g of diisopropyl succinate are added dropwise over the course of 2 hours. The mixture is subsequently stirred at boiling for 3 hours and 45 minutes. After the mixture has cooled to 95° C., 3 g of pigment dispersant of the formula XV, prepared in accordance with Example 6a, are added, the mixture is brought back to boiling and is stirred at boiling for 15 minutes. The reaction suspension is cooled to 80° C. and poured with stirring into 450 g of water heated to 80° C. beforehand. The mixture is heated to boiling and stirred at boiling for 4 hours and 45 minutes. The alcohol is then removed by steam distillation. The pigment suspension is filtered and the solid product is washed salt-free with hot water and dried under reduced pressure at 80° C. This gives 72.2 g of pigment preparation. In the HS varnish, the pigment preparation gives transparent and strongly colored coatings, the rheology is evaluated as 5, and the gloss measurement gives a value of 67.

Example 24a

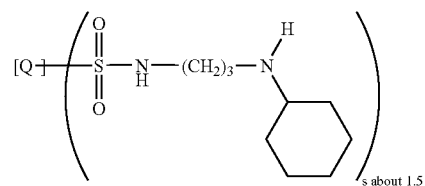

(XXI)

A four-necked flask is charged with 250 parts of chlorosulfonic acid, and 25 parts of 1,4-diketo-3,6-di(4-biphenyl) pyrrolo[3,4-c]pyrrole are introduced and dissolved at a rate such that the temperature does not exceed 25° C. Then 19.64 parts of thionyl chloride are added dropwise over the course of 15 min. and the mixture is stirred for 15 min. Over the course of 15 min, the solution is added dropwise to 1000 parts of ice-water, prepared from 333 parts of ice and 667 parts of water. The precipitated disulfochloride is filtered and washed with 750 parts of cold water. A four-necked flask is charged with 70 parts of ice, 70 parts of water and 23.4 parts of N-cyclohexyl-1,3-propanediamine and the sulfochloride presscake is introduced at from 0 to 5° C. The mixture is then stirred at 0 to 5° C. for 1 h, heated to 25° C. in 30 min, stirred at 25° C. for 30 min, heated to 50° C. in 30 min, stirred at 50° C. for 30 min, heated to 70° C. in 30 min and stirred at 70° C. for 30 min. The product is filtered and washed with water. The presscake is suspended in 782 parts of water and the pH of the suspension is adjusted to 8.6 using a little aqueous sodium hydroxide solution. Steam is passed through the suspension and condensed until about 860 parts of distillate have been obtained. The product is filtered, washed with water and dried in a forced air oven at 80° C. This gives 43.7 parts of pigment dispersant.

From the intensities of the signals, the degree of substitution s is calculated to be about 1.5.

$^1$H-NMR (D$_2$SO$_4$): δ7.8; 7.6; 5.5; 3.1; 2.7; 1.7; 1.6; 1.4; 1.2; 0.9; 0.7 ppm.

Example 24b 20 parts of a standard commercial pigment (C.I. Pigment Red 264) are mixed mechanically with 2 parts of pigment dispersant of the formula XXI prepared in accordance with Example 24a.

A pigment preparation is obtained which gives transparent and strongly colored coatings in the HS varnish. The viscosity is 2.5 s. The gloss measurement gives a value of 78. The metallic coating is strongly colored and bright.

Example 25a

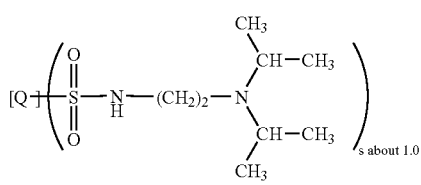
(XXII)

The procedure of Example 24a is repeated except that the amine used comprises 22.3 parts of 2-(diisopropylamino) ethylamine. This gives 40.2 parts of pigment dispersant.

From the intensities of the signals, the degree of substitution s is calculated to be about 1.5.

$^1$H-NMR (D$_2$SO$_4$): δ7.8; 7.7; 7.6; 5.5; 3.3; 3.0; 0.9 ppm.

Example 25b 20 parts of a standard commercial pigment (C.I. Pigment Red 264) are mixed mechanically with 2 parts of pigment dispersant of the formula XXII prepared in accordance with Example 25a.

A pigment preparation is obtained which gives transparent and strongly colored coatings in the HS varnish. The viscosity is 1.5 s. The gloss measurement gives a value of 80. The metallic coating is strongly colored and bright.

Example 26a

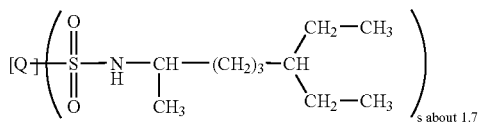
(XXIII)

The procedure of Example 24a is repeated except that the amine used comprises 24.5 parts of 2-amino-5-diethylaminopentane. The presscake is suspended in 796 parts of water and the pH of the suspension is adjusted to 8.7 using a little aqueous sodium hydroxide solution. Steam is passed through the suspension and condensed until about 870 parts of distillate have been produced. The product is filtered, washed with water and dried at 80° C. in a forced air oven. This gives 41.6 parts of pigment dispersant.

From the intensities of the signals, the degree of substitution s is calculated to be about 1.7.

$^1$H-NMR (D$_2$SO$_4$): δ7.8; 7.6; 5.4; 3.7; 2.7; 2.6; 1.5; 1.3; 1.0; 0.8 ppm.

Example 26b 20 parts of a standard commercial pigment (C.I. Pigment Red 264) are mixed mechanically with 2 parts of pigment dispersant of the formula XXIII prepared in accordance with Example 26a.

A pigment preparation is obtained which gives transparent and strongly colored coatings in the HS varnish. The viscosity is 1.5 s. The gloss measurement gives a value of 78. The metallic coating is strongly colored and bright.

Example 27a

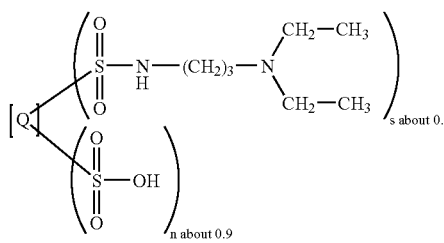
(XXIV)

The procedure of Example 10a is repeated except that instead of 19.54 parts only 7.16 parts of diethylaminopropylamine are used.

This gives 36.7 g of pigment dispersant.

$^1$H-NMR (D$_2$SO$_4$): δ7.8; 7.6; 3.1; 2.7; 1.7; 0.8 ppm.

From the intensities of the signals, a degree of substitution s of about 0.8 is calculated; this indicates a degree of substitution n of about 0.9.

Example 27b 40 parts of a standard commercial pigment (C.I. Pigment Red 264) are mixed mechanically with 4 parts of pigment dispersant of the formula XXIV prepared in accordance with Example 27a. The solvent fastness of the pigment preparation is very good. The pigment preparation obtained gives transparent and strongly colored coatings in the PUR varnish.

What is claimed is:

1. A pigment preparation comprising:
   a) at least one organic base pigment, and
   b) at least one pigment dispersant of the formula (I):

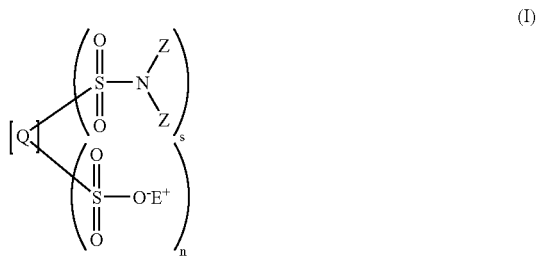
(I)

in which Q is a radical of the diketopyrrolopyrrole compound of the formula (Ia)

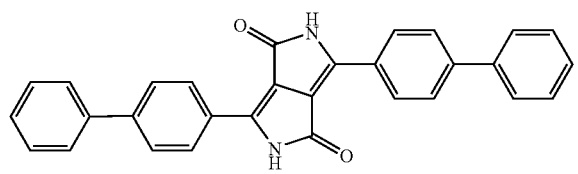
(Ia)

s is a number from 0.1 to about 1.7, n is 2-s,

E$^+$ is H$^+$ or the equivalent M$^{m+}$/m of a metal cation M$^{m+}$ from main groups 1 to 5 or transition groups 1 or 2 or 4 to 8 of the periodic system of the chemical elements, m being 1, 2 or 3, or in which E⁺ defines an ammonium ion of the formula (Ic)

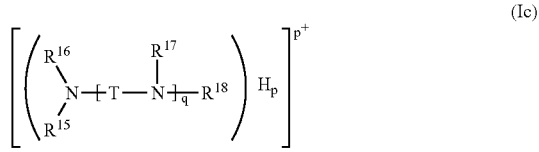

in which
R$^{15}$, R$^{16}$, R$^{17}$ and R$^{18}$ independently of one another are hydrogen or a (poly)alkyleneoxy group of the formula —[CH(R$^{80}$)—CH(R$^{80}$)O]$_k$—H, in which k is a number from 1 to 30 and the two radicals R$^{80}$ independently of one another are hydrogen, C$_1$–C$_4$-alkyl or, if k is >1, a combination thereof;
q is a number from 1 to 10,
p is a number from 1 to 5, where p is ≦q+1;
T is a branched or unbranched C$_2$–C$_6$-alkylene radical; or in which T, if q is >1, may also be a combination of branched or unbranched C$_2$–C$_6$-alkylene radicals;
and in which the two radicals Z are identical or different and Z has the definition Z$^1$ or Z$^4$, where
Z$^1$ is a radical of the formula (Ib)

in which
X is a C$_2$–C$_6$-alkylene radical, a C$_5$–C$_7$-cycloalkylene radical, or a combination of these radicals, it being possible for these radicals to be substituted by from 1 to 4 C$_1$–C$_4$-alkyl radicals, hydroxyl radicals, (C$_1$–C$_4$)-hydroxyalkyl radicals, by 1 or 2 C$_5$–C$_7$-cycloalkyl radicals, or in which X, if q is >1, may also be a combination of said definitions;
Y is an —NR$^2$ group
q is a number from 1 to 10;
R$^2$ and R$^3$ independently of one another are a hydrogen atom, a substituted or unsubstituted, or partly fluorinated or perfluorinated, branched or unbranched (C$_1$–C$_{20}$)-alkyl group, a substituted or unsubstituted C$_5$–C$_7$-cycloalkyl group or a substituted or unsubstituted, or partly fluorinated or perfluorinated (C$_2$–C$_{20}$)-alkenyl group, it being possible for the substituents to be hydroxyl, phenyl, cyano, chloro, bromo, amino, C$_2$–C$_4$-acyl or C$_1$–C$_4$-alkoxy
and where
Z$^4$ is hydrogen.

2. A pigment preparation as claimed in claim 1, wherein the organic base pigment a) is a perylene, perinone, quinacridone, quinacridonequinone, anthraquinone, anthanthrone, benzimidazolone, disazo condensation, azo, indanthrone, phthalocyanine, triarylcarbonium, dioxazine, aminoanthraquinone, diketopyrrolopyrrole, thioindigo, isoindoline, isoindolinone, pyranthrone, isoviolanthrone or carbon black pigment or a mixture thereof.

3. The pigment preparation as claimed in claim 1, comprising:
a) from 50 to 99.5% by weight of the at least one base pigment a),
b) from 0.5 to 20% by weight of the at least one pigment dispersant b) of the formula (I),
c) from 0 to 20% by weight of surfactants, and
d) from 0 to 20% by weight of at least one additive,
the fractions of the respective components being based on the overall weight of the preparation.

4. The pigment preparation as claimed in claim 1, comprising:
a) from 60 to 98.8% by weight of the at least one base pigment a),
b) from 1 to 15% by weight of the at least one pigment dispersant b) of the formula (I),
c) from 0.1 to 15% by weight of surfactants, and
d) from 0.1 to 10% by weight of at least one additive,
the fractions of the respective components being based on the overall weight of the preparation.

5. A process for preparing a pigment preparation as claimed in claim 1, comprising the step of mixing the at least one pigment dispersant with the at least one base pigment.

\* \* \* \* \*